Patented Dec. 28, 1937

2,103,883

UNITED STATES PATENT OFFICE 2,103,883

LAMINATED SAFETY GLASS

George B. Watkins and Roy W. Wampler, Toledo, Ohio, assignors to Libbey-Owens-Ford Glass Company, Toledo, Ohio, a corporation of Ohio No Drawing. Application December 20, 1933, Serial No. 703,252

8 Claims. (Cl. 49—81)

The present invention relates to laminated safety glass and more particularly to an improved cellulosic plastic for use in the manufacture thereof.

Laminated safety glass is a composited structure composed of two sheets of transparent glass with an interposed layer of tough transparent material adherent to the inner surfaces of the glass sheets. Until recently, pyroxylin plastic was in general use as the central plastic layer although cellulose acetate plastic has now become more prominent for this purpose.

In our early research and development work looking toward the adoption of cellulose acetate plastic in lieu of pyroxylin plastic in the manufacture of laminated safety glass, a large number of plasticizers were experimented with in an effort to locate a suitable cellulose acetate plastic that would compare favorably as regards strength of the finished lamination with our then present pyroxylin plastic laminations.

It has been recognized for a long time that cellulose acetate plastic should be more stable towards energies in the form of light and heat, but considerable difficulty was experienced in developing a cellulose acetate plastic of sufficient strength and which could be bonded between glass sheets.

A sheet of cellulose acetate plastic produced by plasticizing the raw cellulose acetate with dimethyl phthalate in the proportions of approximately 70 parts of plasticizer to 100 parts of cellulose acetate can and has been used in the commercial production of laminated safety glass. In fact, laminations made with cellulose acetate plastic of this composition were equal to pyroxylin plastic laminations in our various strength tests measured by impacting with freely falling objects and, as has been demonstrated many times, the resulting cellulose acetate laminations are far superior to the pyroxylin plastic laminations from the standpoint of clarity, uniformity, permanency of bond, stability towards heat and light energy, and practicability from the standpoint of safety glass manufacture.

We found, however, that as in the case of pyroxylin plastic laminations, as the temperature of the cellulose acetate laminations is decreased, the brittleness of the thermo plastic material increases, resulting in a material decrease in the strength of the laminations at the lower temperatures. To illustrate the "critical distance" for impacting a 12 x 12 inch sample of laminated safety glass made from a cellulose acetate plastic lamination formed by plasticizing raw cellulose acetate with dimethyl phthalate in the proportions of approximately 70 parts of plasticizer to 100 parts of cellulose acetate, the plastic being twenty-five thousandths of an inch in thickness, at a temperature of 70° F., is 48 inches with a two pound steel ball, while at a temperature of 10° F., the critical distance for the same type of impact is 21 inches. By "critical distance" we mean the distance through which the two pound ball falling freely will produce failure of the lamination by breaking it in two or more pieces with approximately fifty per cent of the samples impacted. These break test values are also typical of laminated safety glass made with pyroxylin plastic sheeting of about the same thickness.

We did not feel that the critical distance for the 12 x 12 inch samples at 10° F. was sufficient, and concluded that commercial laminated safety glass should and could be made with a plastic having greater strength at the lower temperatures. As a matter of fact, driving conditions are usually more hazardous at the lower temperatures, with ice and snow being prevalent, so that increased brittleness of the plastic at these lower temperatures and to the extent mentioned is of course a serious matter.

In an endeavor to increase the so-called critical distance of laminations at the lower temperatures, we experimented with different plasticizers as well as increasing the plasticizer content of the plastic. By way of illustration, it may be mentioned that the content of the cellulose acetate plasticizer was studied through a range of from approximately 40 parts of plasticizer per 100 parts of raw acetate to as high as 100 parts of plasticizer per 100 parts of raw acetate. We found that in general, the breaking strength of cellulose acetate laminations made with the more highly plasticized sheet was increased at 10° F. This increase, however, was not material when the plasticizer content of the cellulose acetate plastic was increased from 70 to 100 parts of dimethyl phthalate per 100 parts of acetate, only increasing the critical distance from approximately 21 to 23 inches at 10° F.

Continuing our work, we found that cellulose acetate plasticized with a mixture of dimethyl phthalate and carbitol acetate gives unexpectedly improved laminated safety glass in that the strength of the laminated sample when impacted at normal room temperature is not noticeably decreased while the strength of the finished lamination made with this plastic and impacted in the cold, for example 10° F., is greatly improved.

This improvement in strength in the cold is material, the critical distance being increased from 21 inches to approximately 32 inches when the plastic contains approximately 76 parts of total plasticizer per 100 parts of cellulose acetate, the 76 parts of plasticizer consisting of fifty-five per cent dimethyl phthalate and forty-five per cent carbitol acetate. Furthermore, the mixture of plasticizers contained in the plastic can be increased from 76 parts to 90 parts or more to give even greater strength to the finished lamination at 10° F. without materially decreasing the strength of the lamination at room temperature.

We adopted the use of 12 x 12 inch samples and a two pound steel ball as standard in the testing of laminated safety glass in determination of the critical distance, so that it will be understood that throughout the specification and claims when giving critical distances and when referring to tests made, 12 x 12 inch samples were employed and were impacted with a two pound steel ball falling through whatever distance is specified. Likewise, plastic approximately twenty-five thousandths of an inch in thickness and plate glass one-eighth inch in thickness was used in all tests, so that the different results obtained were dependent on the character of plastic per se. It may also be accepted that the critical distance of safety glass made with pyroxylin plastic and cellulose acetate prior to our invention was approximately 21 inches at 10° F. and 48 inches at 70° F.

By way of example, we have found that cellulose acetate plastic made up of the following formulas gives a much improved laminated glass from the standpoint of resistance to impact at the lower temperatures:

*Formula 1*

| | Parts |
|---|---|
| Cellulose acetate | 100 |
| Plasticizer, consisting of 50 parts dimethyl phthalate and 40 parts carbitol acetate | 90 |

*Formula 2*

| | Parts |
|---|---|
| Cellulose acetate plasticized with | 100 |
| Plasticizer containing 60 parts dimethyl phthalate and 30 parts carbitol acetate | 90 |

*Formula 3*

| | Parts |
|---|---|
| Cellulose acetate plasticized with | 100 |
| Plasticizer consisting of 45 parts dimethyl phthalate and 45 parts of carbitol acetate | 90 |

Formulas 1, 2 and 3 have been found to give desirable results. We have also found that the total plasticizer content of any one of these formulas can be varied from 75 to 100 parts of the mixed plasticizers in the finished lamination, all combinations giving material improvement from the standpoint of break tests at very low temperatures over laminated safety glass made with pyroxylin plastic and cellulose acetate plastic prior to our invention.

When referring above to the 76 parts of total plasticizer per 100 parts of cellulose acetate, this means that the plasticizer content of the cellulose acetate plastic at the time it was to be bonded between the glass sheets contained 76 parts of total plasticizer to 100 parts of cellulose acetate. The plasticizer content of the finished seasoned sheet is ordinarily lower per 100 parts of cellulose acetate than the plasticizer content of the original batch from which the sheeting is made. Therefore, it depends upon the particular plasticizer mixture and undoubtedly the particular cellulose acetate used and process of manufacture as to just what percentage of plasticizer should be included in the original mix to give the desired total plasticizer content in the finished plastic at time of lamination.

Plastic made by the above formulas not only produces laminated safety glass which gives a greatly improved break test at very low temperatures over present day commercial laminated safety glass, but the plastic is equally as stable, if not more stable, than such present day laminations.

Notwithstanding the fact that carbitol acetate has a slightly lower boiling point and a correspondingly higher vapor pressure than the dimethyl phthalate, this combination is an excellent plasticizer or solvent for cellulose acetate and this is probably explained by the theory of mixed solvents as the vapor pressure of the carbitol acetate is reduced when being mixed with dimethyl phthalate in the approximate proportions mentioned. We have found by actual test that the vapor pressure of the mixed plasticizer of dimethyl phthalate and carbitol acetate is sufficiently low that the loss of plasticizer from the cellulose acetate sheet is not material and can be safely used in commercial operations such as laminated glass manufacture without affecting the uniformity of the product which might occur should the cellulose acetate plastic lose any material amount of plasticizer when held in storage for a reasonable length of time at normal temperatures. As stated above, the plastic is stable to heat and light energy so that laminated safety glass made therewith can be subjected to the normal temperatures and other conditions ordinarily encountered in commercial use without being adversely affected, and furthermore is considerably more plastic at lower temperatures than prior cellulosic plastics used.

It is thus obvious that by making cellulose acetate plastic in accordance with our invention, the critical distance is increased from 21 inches at 10° F. to a point substantially in excess of this without materially decreasing the critical distance at 70° F. or normal temperature. In other words, our improved plastic does not increase in brittleness as the temperature is decreased as rapidly as in the case of the prior art plastics above referred to, so that much greater protection is afforded with laminated safety glass at the lower temperatures than heretofore, without diminishing the degree of protection afforded at moderate temperatures such as 70° F.

It may be mentioned that in our early experimental work on this particular problem, different thicknesses of plastic were tried and in fact we used cellulose acetate plastic as thick as fifty thousandths of an inch in an effort to increase the critical distance at the lower temperatures. Some improvement is found as the thickness of the plastic is increased from the twenty-five thousandths of an inch, but other difficulties are encountered which more than offset the advantages gained in that the plastic costs twice as much when the thickness is doubled, it lacks the necessary clarity, manufacture thereof is more difficult, the overall thickness of the finished glass is greater than desired, and many other undesirable features are introduced. As the thickness of the plastic is increased much above twenty-five thousandths inch, laminated safety glass made therewith is not as clear or transparent because of what we may term an excessive amount of plastic material present between the glass. Aside from this, even when the thickness of the plastic is doubled, the critical distance at 10° F. is not as great as with the twenty-five thousandths inch thickness of plastic made with the mixture of plasticizers above set forth. Naturally, if the fifty thousandths inch plastic is produced with the mixture of plasticizers, it is far superior as regards the critical distance at the low temperatures than plastic made without such a mixture.

Thus, our invention contemplates increasing the critical distance of laminated safety glass made with cellulose materials, at the lower temperature, and this can be accomplished by using carbitol acetate or some other plasticizer or solvent of the character of carbitol acetate.

We claim:

1. Laminated safety glass comprising two sheets of glass and an interposed layer of cellulose acetate plastic including at least some carbitol acetate as a plasticizer.

2. Laminated safety glass comprising two sheets of glass and an interposed layer of cellulose acetate plastic formed from raw cellulose acetate plasticized with a mixture of plasticizers therefor including carbitol acetate.

3. Laminated safety glass comprising two sheets of glass and an interposed layer of cellulose acetate plastic formed from raw cellulose acetate plasticized with a mixture of plasticizers therefor including a sufficient amount of carbitol acetate so that a layer approximately twenty-five thousandths of an inch thick of cellulose acetate plastic between the glass will result in a laminated safety glass whose critical distance at 10° F. will be substantially in excess of twenty-one inches.

4. Laminated safety glass comprising two sheets of glass and an interposed layer of cellulose acetate plastic formed from raw cellulose acetate plasticized with a mixture of an ester of phthalic acid and carbitol acetate.

5. Laminated safety glass comprising two sheets of glass and an interposed layer of cellulose acetate plastic formed from raw cellulose acetate plasticized with a mixture of an ester of phthalic acid and carbitol acetate in the ratio of approximately 76 parts of total plasticizer to 100 parts of raw cellulose acetate in the finished sheet.

6. Laminated safety glass comprising two sheets of glass and an interposed layer of cellulose acetate plastic formed from raw cellulose acetate plasticized with a mixture of dimethyl phthalate and carbitol acetate.

7. Laminated safety glass comprising two sheets of glass and an interposed layer of cellulose acetate plastic including sufficient plasticizer of the character of carbitol acetate so that if the thickness of said layer is approximately twenty-five thousandths of an inch, the critical distance of the laminated safety glass at 10° F. will be substantially in excess of twenty-one inches.

8. Laminated safety glass comprising two sheets of glass and an interposed layer of cellulose acetate formed from raw cellulose acetate plasticized with a mixture of plasticizers including carbitol acetate in the ratio of total plasticizer of from 70 parts to 100 parts per 100 parts of raw cellulose acetate.

GEORGE B. WATKINS.
ROY W. WAMPLER.